(12) United States Patent
Swan

(10) Patent No.: US 8,518,578 B2
(45) Date of Patent: Aug. 27, 2013

(54) ELECTRODE PLATE FOR AN ELECTROMECHANICAL BATTERY

(76) Inventor: David H. Swan, Tatamagouche (CA)

( * ) Notice: Subject to any disclaimer, the term of this patent is extended or adjusted under 35 U.S.C. 154(b) by 119 days.

(21) Appl. No.: 13/385,343

(22) Filed: Feb. 15, 2012

(65) Prior Publication Data

US 2012/0148904 A1    Jun. 14, 2012

Related U.S. Application Data

(63) Continuation of application No. 11/468,235, filed on Aug. 29, 2006, now abandoned.

(60) Provisional application No. 60/712,762, filed on Aug. 30, 2005.

(51) Int. Cl.
*H01M 6/12*    (2006.01)

(52) U.S. Cl.
USPC .......................... 429/162; 429/160; 429/233

(58) Field of Classification Search
USPC ......................................................... 429/160
See application file for complete search history.

(56) References Cited

U.S. PATENT DOCUMENTS

| 4,278,744 | A  | * | 7/1981  | Athearn .................. 429/181 |
| 4,865,933 | A  | * | 9/1989  | Blanyer et al. ............... 429/241 |
| 6,265,108 | B1 | * | 7/2001  | Chalasani .................... 429/131 |
| 6,287,720 | B1 | * | 9/2001  | Yamashita et al. ............ 429/131 |
| 6,436,571 | B1 | * | 8/2002  | Passaniti et al. ............. 429/174 |
| 2001/0036574 | A1 | * | 11/2001 | Fukuda et al. ................ 429/161 |
| 2002/0061435 | A1 | * | 5/2002  | Hisai ............................. 429/94 |
| 2004/0256640 | A1 | * | 12/2004 | Zayatz ......................... 257/202 |
| 2005/0255379 | A1 | * | 11/2005 | Marchio et al. .............. 429/153 |

\* cited by examiner

*Primary Examiner* — Ula C Ruddock
*Assistant Examiner* — Archer Dudley
(74) *Attorney, Agent, or Firm* — Mario Theriault

(57) ABSTRACT

The electrode plate for use in an electrochemical battery is made of a casting; a planar portion; a perimeter and a bus bar extending along a portion of that perimeter. The planar portion and the bus bar are integral parts of the aforesaid casting. The electrode plate is made of lead when used in a lead-acid battery or of other electrode material capable of being formed by casting, when used in other types of batteries. More specifically, the electrode plate has a rectangular shape and a higher-current-density side, and the aforesaid bus bar extends over three adjacent sides of the rectangular shape including the higher-current-density side.

3 Claims, 5 Drawing Sheets

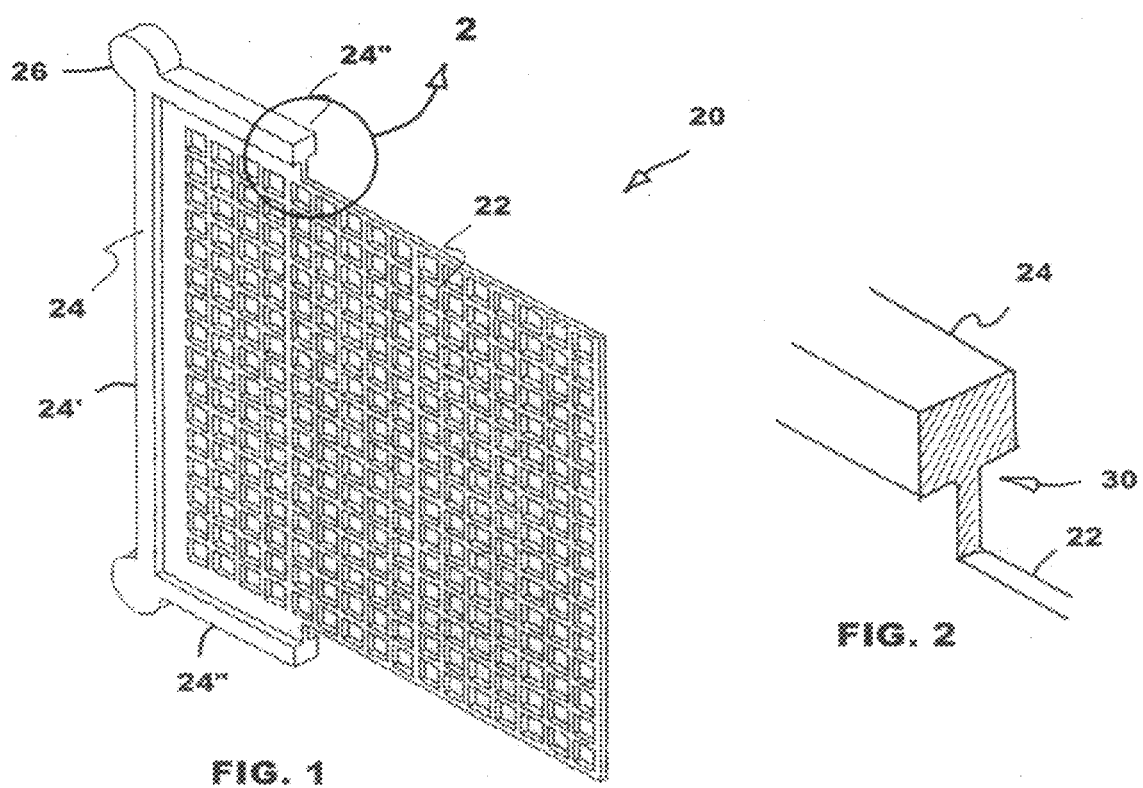

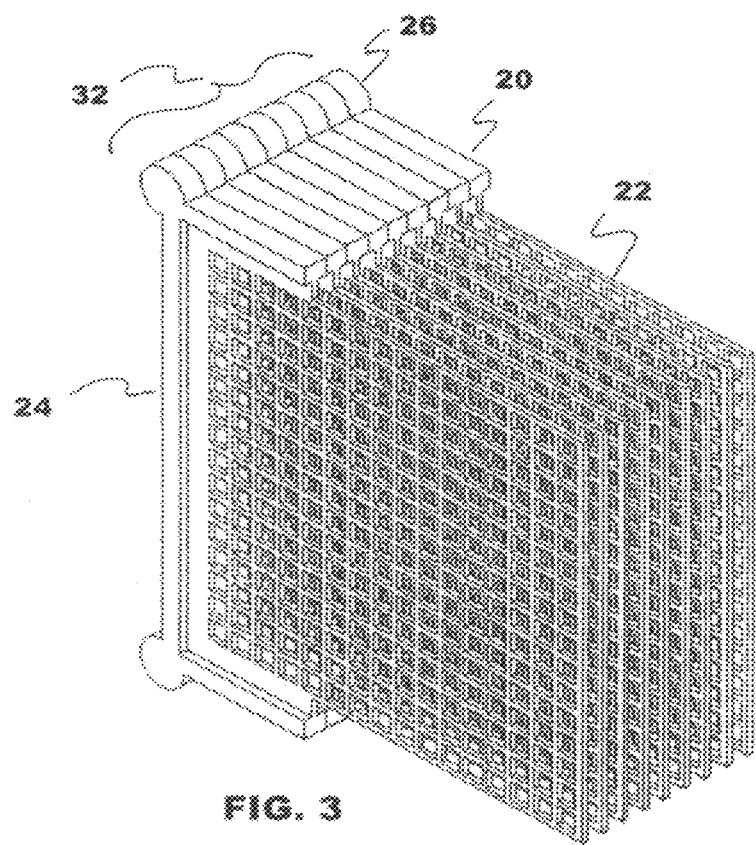

ELECTRODE PLATE FOR AN ELECTROMECHANICAL BATTERY

This application is a continuation application of application Ser. No. 11/468,235, filed Aug. 29, 2006 now abandoned which claims the benefit of U.S. Provisional Application No. 60/712,762 filed Aug. 30, 2005. Both applications are incorporated herein by reference.

FIELD OF THE INVENTION

This invention pertains to electrode plates for electrochemical batteries and more particularly, it pertains to the structure of electrode plates or cell plates for electrochemical batteries.

BACKGROUND OF THE INVENTION

High-capacity, high-endurance batteries have been used for many years in locomotives, submarines and electric power stations to name only a few examples. These days, high-reliability batteries are becoming more popular in electric cars and electric buses. These batteries represent a large investment for a user and are expected to last a long time.

These batteries are subject to high amperage during peak demand. They are subject to shock and vibration when used in road vehicles, and to expansion and contraction by heat and cold. For these reasons, the electrical resistance and the structural integrity of any connection inside a battery are directly related to the performance and longevity of that battery.

For reference purposes, examples of electrochemical batteries of the prior art are described below.

U.S. Pat. No. 1,377,087 issued to J. A. Manns on May 3, 1921; and U.S. Pat. No. 6,308,639 issued to F. W. Donnelly et al., on Oct. 30, 2001, illustrate well the magnitude of battery sizes and power used in electric locomotives.

US Patent Application US 2001/0036574 published on Nov. 1, 2011, by S. Fukuda et al.; and
US Patent Application US 2004/0229121 published on Nov. 18, 2004, by S. Hamada et al., are related to the structure of electrode plates in electrochemical batteries. Both documents teach a structure and a method for manufacturing electrode plates for use in electrochemical batteries.

More specifically, the latter documents describe rechargeable batteries wherein each electrode plate is connected to a lead bar and to a bus bar by electronic welding, seam welding or resistance welding.

It will be appreciated that the conductance of an electrode plate is the primary concern herein. As mentioned before, the welding of a joint on that electrode plate has detrimental effects on the efficiency and durability of the battery in which the electrode plate is mounted.

The best prior art found teach batteries having brazed connections, and joints made by resistance welding. Firstly, by definition, a brazed connection contains at least two materials in contact with each other; a base metal and a filler metal. The filler metal must have a significantly lower melting temperature than the base metal of the pieces to be joined so that the filler metal may properly wet the pieces to be joined. When heated, the filler metal spreads in the gap of the joint by capillary action, but creates no metallurgical bond with the base metal.

Because of the filler metal in a brazed connection, the connection has different electrical conductivities and different mechanical properties at the interface.

Because of the gap between the parts to be joined, there are uneven thicknesses of the filler metal in the gap. The electrical resistance of the connection differs from that of the base metal.

Because of the filler metal, a brazed connection has thermal mismatches (different thermal expansion coefficients) causing thermal stresses (hot spots) at the interface and thermal fatigue at joints due to repetitive heating/cooling. This leads to cracking of the connection in time.

A brazed connection in a battery has adverse effects on the performance and durability of the battery because it creates voltage drop and cracking.

Secondly, a joint made by resistance welding uses high current and pressure to cause localized fusion of the parts to be joined. This process is predominantly used for spot welding.

There are impurities between the surfaces to be joined when these surfaces are melted together. Undeniably there are dust particles in all shop environments. These dust particles find their ways into any manufacturing process.

The surfaces of both parts are coming from two different foundry stocks and do not have identical metallurgical contents. These parts do not have identical thicknesses, and therefore not the same resistance to the welding current. The surfaces of the mating parts have been affected to various degrees by oxidation, simply by being exposed to a shop environment.

And yet, even a surface with zero roughness contains microscopic mounds and valleys entrapping air pockets and water vapours and other gases found in a manufacturing shop environment. The resulting weld contains porosity and microscopic laminations.

In a resistance welding process, it is almost impossible to evenly distribute the flow of electron across the surface of the joint. Because of this difficulty, a joint made by resistance welding contains, at a microscopic level, a certain amount of metal being burnt, a certain amount of metal that is molten according to ideal conditions, and a certain amount of metal that has not been sufficiently molten. And in all cases, the tempering of the metal is lost, often causing brittleness around the joint.

Because of the burnt metal; brittleness; oxidation; porosity and laminations, a joint made by resistance welding also has less than ideal conductance, and thermal mismatches leading to thermal stresses and cracking of the connection in time.

Therefore, both connections made by resistance welding and by brazing inside a battery have adverse effects on the performance and durability of the battery because of the resulting voltage drop and cracking.

For these reasons, basically, there is a long felt need in the field of high-endurance, high-capacity batteries for an electrode plate that has better joints than those described in the prior art literature.

SUMMARY OF THE INVENTION

In the present invention, there is provided a new and improved electrode plate with integrally cast components. The electrode plate according to the present invention has uniform electrical conductance and uniform heating when current flows through it to ensure best performance and a long battery life.

In one aspect of the present invention, there is provided an electrode plate for use in an electrochemical battery. This electrode plate is made of; a casting; a planar portion; a perimeter and a bus bar extending along a portion of that perimeter. The planar portion and the bus bar are integral parts of the aforesaid casting.

The electrode plate is made of lead when used in a lead-acid battery or of other electrode material capable of being formed by casting, when used in other types of batteries.

In another aspect of the present invention, the planar portion of the electrode plate has a rectangular shape and a higher-current-density side, and the aforesaid bus bar extends over three adjacent sides of the rectangular shape including the higher-current-density side.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which:

FIG. 1 is an isometric view of an electrode plate according to the preferred embodiment of the present invention;

FIG. 2 is an enlarged view of the cast joint in the preferred electrode plate as seen in circle 2 in FIG. 1;

FIG. 3 is an isometric view of a stack of electrode plates according to the preferred embodiment of the present invention;

DESCRIPTION OF THE PREFERRED EMBODIMENT

Figure 4:
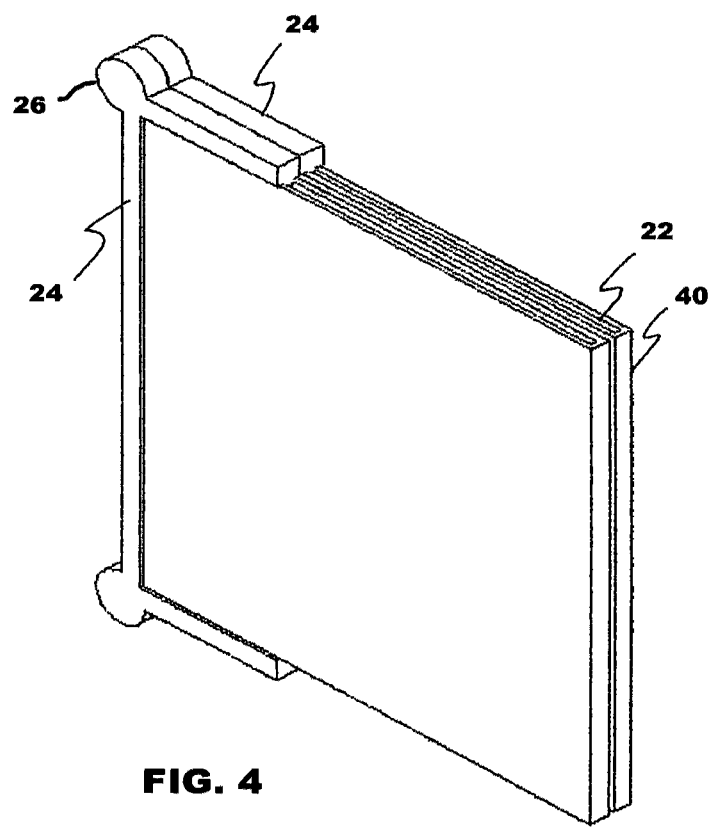
FIG. 4 illustrates a pair of preferred electrode plates encapsulated with plate separators.

In the following description, lead-acid battery chemistry is used to illustrate the principles of the present invention. However, the principles described herein is applicable to other electrochemical cell chemistries as for examples; nickle-metal hydride, nickel-zinc and lithium ion.

Referring now to FIG. 1, the preferred electrode plate 20 is illustrated therein. The electrode plate 20 is made of a rectangular planar grid-like portion 22. The grid-like planar portion 22 is partly enclosed by a C-like shaped current collector frame 24 which is referred to herein as a bus bar.

The bus bar 24 has an upright segment 24' extending the full height of one edge of the electrode plate 20 and two arm segments 24" extending along a respective portion of each of the two edges adjacent the aforesaid one edge. The central segment 24' and the arm segments 24" meet at two corners of the electrode plate 20.

The two corners of the electrode plate 20 mentioned above have enlarged cylindrical tabs 26 thereon. These enlarged cylindrical tabs 26 have a flat disc-like shape; a same thickness as the bus bar 24 and a diameter of about twice the thickness of the bus bar 24.

More importantly, the preferred electrode plate 20 is formed in a casting process wherein all its components are integrally connected. As can be seen in FIG. 2, the planar portion 22 is integrally formed with the bus bar 24. The preferred electrode plate 20, as shown in FIG. 1, is made of lead, moulded in one piece using a single casting process. The metallurgy of the planar portion 22 is therefore identical to the composition of the bus bar 24 and identical to the composition of the transition region 30, or the connection between the planar portion 22 and the bus bar 24. The cast connection 30 ensures an uniform electrical conductance and uniform heating when current flows through it to ensure best performance and a long battery life.

The stack of electrode plates 20 illustrated in FIG. 3 contains several electrode plates 20 with the planar portion 22 and the bus bar 24 for illustrative purposes only. From this illustration, one can appreciate that all the electrode plates 20 in an electrochemical battery cell are identical. The juxtaposed enlarged cylindrical tabs 26 form a cylindrical terminal block 32. Although a cylindrical shape is suggested, it will be appreciated that other shapes, such as oval, rectangular or square cross-sections can be used.

The plate separators 40 shown in FIG. 4 have a sheet-like appearance and are inserted between the electrode plates 20 as shown in FIG. 3, that include the planar portion 22, the bus bar 24 and juxtaposed enlarged cylindrical tabs 26 to keep them from touching, as it is known in battery design. The plate separators 40 are made of material that can readily absorb the electrolyte used in the battery.

Figure 5:
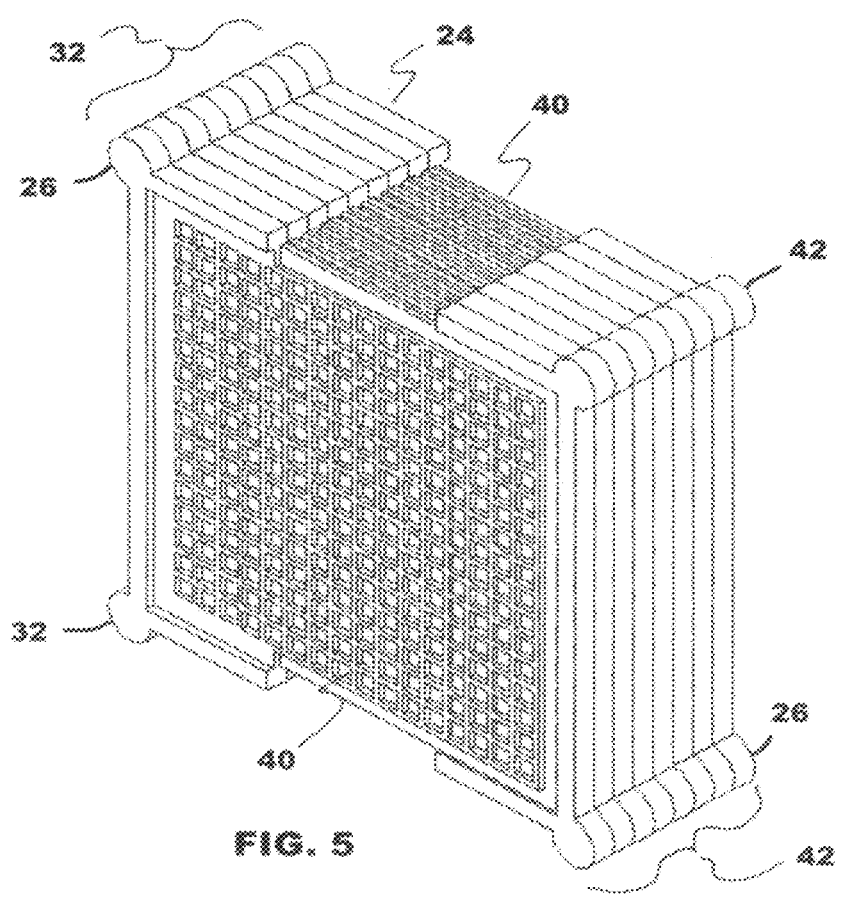
FIG. 5 is an isometric view of an assembly of positive and negative electrode plates separated by plate separators.

When electrode plate pairs 20, as shown in FIG. 3, are mounted together with plate separators 40 impregnated with an electrolyte as represented in FIG. 5, a battery is formed. Each electrode plate 20 is covered with a positive or negative paste according to their placement in the stack. As can be understood, adjacent electrode plates 20 are mounted in mirror images of each other and have opposing polarity.

The enlarged tabs 26 on the positive electrode plates 20 form a positive terminal block 32, and the juxtaposed enlarged tabs 26 on the negative electrode plates 20 form a negative terminal block 42.

The bus bar 24 has a square cross-section and a thickness that is slightly more that the thickness of the planar portion 22, as shown in FIG. 4, plus the thickness of the plate separators 40 on both sides of the planar portion 22. In use, the terminal blocks 32, 42 and the bus bars 24 are held tight against each other by bolts, straps, by brazing or otherwise. Because of their thicknesses, the bus bars 24 form solid walls around portions of the electrode pairs to further reduce resistance between the planar portions of the terminal blocks 32, 42.

Those skilled in the field of batteries will appreciate that the solid conductive walls mentioned above are located in region of higher-current-density of that battery.

Figure 6:
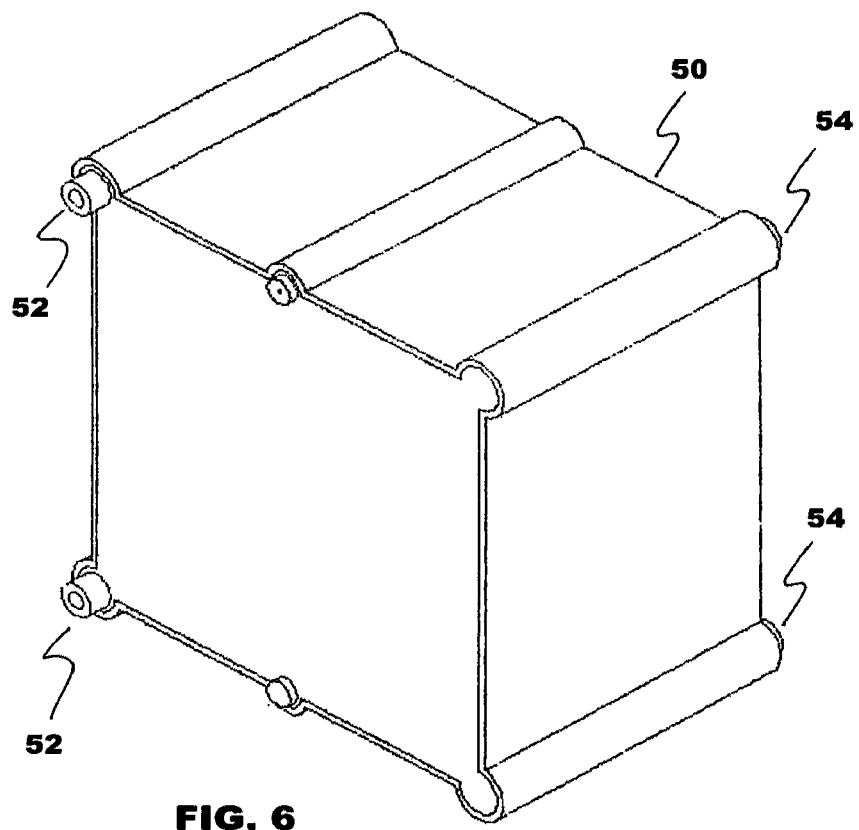
FIG. 6 is an isometric view of the stack of electrode plates as shown in FIG. 5 enclosed in a battery casing.

Referring lastly to FIG. 6, the assembly of electrode pairs as shown in FIG. 5 is preferably mounted in a sealed casing 50, with their terminal blocks 32, 42, as shown in FIG. 5, held under compressive forces. Battery connectors 52 extend through the casing 50 and are threaded or otherwise connected to the positive terminal blocks 32, and the connectors 54 are similarly connected to the negative terminal blocks 42. Connectors 52, 54 constitute the positive and negative battery terminals.

Additional description pertaining to the structure of the preferred battery and further explanation concerning the generation of electricity within that battery is deemed unnecessary to those skilled in this field of electrochemical batteries and therefore it is not provided.

What is claimed is:

1. An electrochemical battery cell comprising an array of positive cast lead electrodes and an array of negative cast lead electrodes; and each of said arrays of cast lead electrodes including;
  a first pair of cast lead electrodes, each of said cast lead electrodes in said first pair having;
  a rectangular planar portion with overall height and width dimensions;

a solid outside edge bordering said planar portion along a full length of one of said overall height and width dimensions;

a singular bus bar extending from and along a full length of said solid outside edge;

said singular bus bar being integrally formed by casting, onto said solid outside edge;

said singular bus bar having two opposite and identical lead side surfaces extending along a full length thereof parallel with said planar portion; said lead side surfaces being raised relative to said planar portion;

said cast lead electrodes in said first pair being mounted side by side with one of said lead side surfaces on said singular bus bar on one of said cast lead electrodes being laid against and in full matching-outline contact with an entire said lead side surface on said singular bus bar on the other cast lead electrode in said first pair of cast lead electrodes, such that both said singular bus bars on said first pair of cast lead electrodes jointly form a conductive lead wall along said solid outside edges for transporting electrons between each of said planar portions and a respective one of said singular bus bars and between said singular bus bars.

2. The electrochemical battery cell as claimed in claim 1, further comprising a second pair of cast lead electrodes mounted astride and parallel with said first pair of cast lead electrodes in a mirror-image arrangement relative to said first pair of cast lead electrodes, and separators mounted between said planar portions in said first and second pairs of cast lead electrodes for separating said cast lead electrodes in said first pair of cast lead electrodes from said cast lead electrodes in said second pair of cast lead electrodes.

3. The electrochemical battery cell as claimed in claim 2, wherein each of said singular bus bars has corners and enlarged portions at said corners, and each of said enlarged portions having a flat disc-like shape, and having said enlarged portions on said first pair of cast lead electrodes being in contact with each other for transporting electrons from said cast lead electrodes in said first pair, and said enlarged portions on said second pair of cast lead electrodes being in contact with each other for transporting electrons from said cast lead electrodes in said second pair.

* * * * *

UNITED STATES PATENT AND TRADEMARK OFFICE
CERTIFICATE OF CORRECTION

PATENT NO. : 8,518,578 B2  
APPLICATION NO. : 13/385343  
DATED : August 27, 2013  
INVENTOR(S) : David H. Swan Page 1 of 1

It is certified that error appears in the above-identified patent and that said Letters Patent is hereby corrected as shown below:

On the Title Page, Item (54) and in the Specification, Column 1, Line 1, Title should read:

ELECTRODE PLATE FOR AN ELECTROCHEMICAL BATTERY

Signed and Sealed this
Eighth Day of October, 2013

Teresa Stanek Rea
*Deputy Director of the United States Patent and Trademark Office*